United States Patent [19]

Jorritsma

[11] Patent Number: 4,669,308

[45] Date of Patent: Jun. 2, 1987

[54] METHOD AND APPARATUS FOR DETERMINING LIQUID FLOW RATES

[76] Inventor: Johannes N. Jorritsma, 37 Yonge Street N., Aurora, Ontario, Canada, L4G 1N6

[21] Appl. No.: 721,411

[22] Filed: Apr. 9, 1985

[51] Int. Cl.$^4$ .............................................. G01F 3/38
[52] U.S. Cl. ........................................ 73/223; 73/861
[58] Field of Search ................... 73/861, 223; 364/510

[56] References Cited

U.S. PATENT DOCUMENTS

| | | | |
|---|---|---|---|
| 3,350,937 | 11/1967 | Brewer | 73/224 |
| 4,127,030 | 11/1978 | Martig | 73/861 |
| 4,455,870 | 6/1984 | Jorritsma | 73/223 |

Primary Examiner—Herbert Goldstein
Attorney, Agent, or Firm—Sim & McBurney

[57] ABSTRACT

There is provided a method of determining the total inflow of a liquid through a liquid-flow system such as a sewage pumping station, in which liquid enters a sump cavity and is pumped out of the sump cavity on a periodic basis. The probable inflow rate during each pumping cycle is derived by first determining the true inflow rate prior to the beginning of a pumping cycle and extrapolating its trend forward through the time of the pumping cycle to arrive at a first calculated inflow rate, then determining the true inflow rate after the end of a pumping cycle and extrapolating its trend backward through the time of the pumping cycle to arrive at a second calculated inflow rate, and averaging the first and second calculated inflow rates to obtain the probable inflow rate during the pumping cycle. This latter rate is then multiplied by the time during which pumping takes place to yield an inflow during pumping, and this amount is added to the sump volume for each complete cycle.

10 Claims, 3 Drawing Figures

METHOD AND APPARATUS FOR DETERMINING LIQUID FLOW RATES

This invention relates generally to method and apparatus for determining an accurate measurement of the flow of liquid through a liquid system, for example a sewage system.

BACKGROUND OF THIS INVENTION

The prior art contains a number of patents directed to flow rate determining devices for liquid flowing in a liquid system. For example, U.S. Pat. No. 2,101,257, issued Dec. 7, 1937 to M. Vogel-Jorgensen, for "Apparatus for Measuring Liquid or Fluent Materials" discloses a measuring device for cement slurries fed to a rotary kiln. The concept is to provide a calibrated volume which may be placed into or out of the normal flow line for the cement slurry, such that a flow rate may be taken at intervals in order to monitor the rate at which the cement slurry is fed. This arrangement does not, of course, give an accurate totalized volume of flow over an entire flow period, but merely allows the instantaneous rate to be monitored from time to time. From these instantaneous rates, of course, an approximate idea may be had of the total volume passing through the flow line, but exact precision is not possible.

A similar problem arises with U.S. Pat. No. 2,392,951, R. G. Salisbury, issued Jan. 14, 1946 and entitled "Flow Meter". Here again, a calibrated volume is adapted to be placed into or out of connection with a line along which a fluid is continually flowing, in order to be able to monitor the rate of flow at specific intervals. However, a totalized and accurate flow volume over a continuous time period cannot be obtained by the use of the flow meter disclosed in this patent.

My own earlier U.S. Pat. No. 4,455,870, issued June 26, 1984 and entitled "Method and Apparatus for Determining Liquid Flow Rates" represents a particular solution to the problems inherent in the prior art. My previous patent provides a method of determining the total inflow of a liquid through a liquid-flow system in which the liquid enters a sump cavity and is pumped out of the sump cavity by pump means. A computing means calculates an on-going total inflow volume for the liquid by (i) adding in the sump cavity volume between lower and upper limit levels each time the liquid surface rises to the upper limit level, and (ii) determining the inflow rate over the last portion of the filling time just described and extrapolating this inflow rate over the time when the pump means is pumping to yield an incremental quantity, such quantity being added in to the on-going total inflow volume.

The method set forth in my earlier patent, while providing a satisfactory procedure for determining the total inflow volume, is nonetheless not absolutely accurate particularly in cases where, during the pumping cycle, the inflow rate changes more or less dramatically. In other words, the extrapolation of a previously measured rate through the pumping cycle, without taking into account a variation of the inflow rate during the pumping, can lead to an error.

In view of this problem, it is an aspect of the present invention to allow a more accurate determination of the true inflow rate during the pumping cycle, thus attaining greater accuracy in the calculation of the total inflow of the liquid.

GENERAL DESCRIPTION OF THIS INVENTION

Generally speaking, this invention provides, in a liquid pumping station having a wetwell into which liquid flows at a variable rate, and pumping means adapted to periodically pump liquid out of the wetwell at a rate faster than the maximum likely inflow rate, a method of deriving a probable inflow rate during each pumping cycle. The method includes:

(a) measuring both the inflow rate and any change in such inflow rate prior to the beginning of a pumping cycle, (b) calculating a first extrapolated inflow rate by combining the inflow rate prior to a pumping cycle with its rate of change, (c) measuring both the inflow rate and any change in said last-mentioned inflow rate subsequent to the end of a pumping cycle, (d) calculating a second extrapolated inflow rate by combining the inflow rate subsequent to the end of a pumping cycle with its rate of change, and (e) averaging the first and second extrapolated inflow rates to obtain the probable inflow rate.

According to another aspect, this invention provides a method of determining the total inflow of a liquid through a liquid-flow system in which the liquid enters a wetwell and is pumped out of the wetwell by pump means, comprising the steps:

(a) allowing the liquid surface to rise between a predetermined lower limit level and a predetermined upper limit level while the pump means is shut off, (b) detecting the arrival of the liquid surface at a plurality of predetermined intermediate levels as it rises between the lower limit level and the upper limit level, the intermediate levels being vertically separated and delimiting a plurality of time segments during each of which the liquid level rises between an adjacent pair of levels, (c) detecting the arrival of the liquid surface at the upper limit level, and signalling the pump means to begin upon such arrival, (d) pumping the liquid out of the wetwell at a rate faster than the inflow rate, whereby the liquid surface falls between said upper limit level and said lower limit level, (e) detecting the arrival of the liquid surface at the lower limit level and turning off the pump means at such last-mentioned arrival, (f) again allowing the liquid surface to rise as in step (a) and repeating steps (b), (c), (d) and (e) in sequence, (g) calculating an on-going total inflow volume for the liquid by:

(1) adding in the sump cavity volume between the lower and upper limit levels each time the liquid surface rises to the upper limit level, and for each pumping cycle:

(2) determining the inflow rates over at least two time segments immediately before the pumping begins and the difference in the two rates, and extrapolating the rate of the time segment closest to the beginning of pumping, corrected by applying said difference, forward through the pumping cycle to arrive at a first calculated inflow rate, (3) determining the inflow rates over at least two time segments immediately after the pumping ceases, and the difference in the two last-mentioned rates, and extrapolating the rate of the time segment closest to the ending of pumping, corrected by applying said last-mentioned difference, backward through the pumping cycle to arrive at a second calculated inflow rate, (4) averaging said first and second calculated inflow rates, (5) multiplying the averaged inflow rate by the time span during which the pumping was taking place to arrive at a volume of liquid entering while each pumping phase was occuring, and (6) adding in said last-mentioned volume for each pumping cycle.

According to a still further aspect of this invention, there is provided apparatus for determining the total inflow for liquid entering a wetwell, comprising:

first means for pumping the liquid out of said wetwell at a rate faster than the inflow rate, second means for detecting the arrival of the liquid surface at a predetermined upper limit level and for generating a first signal which turns on said first means, third means for detecting the arrival of the liquid surface at a predetermined lower limit level and for generating a second signal which turns off said first means, fourth means for detecting the arrival of the liquid surface at a plurality of predetermined intermediate levels as it rises between the lower limit level and the upper limit level, and for generating an additional signal for each such intermediate level, and computing means adapted to calculate an on-going total inflow volume for the liquid by (1) adding in the sump cavity volume between the lower and upper limit levels each time the liquid surface rises to the upper limit level, and for each pumping cycle:

(2) determining the inflow rates over at least two time segments immediately before the pumping beings and the difference in the two rates, and extrapolating the rate of the time segment closest to the ending of pumping, corrected by applying said last-mentioned difference, forward through the pumping cycle to arrive at a first calculated inflow rate, (3) determining the inflow rates over at least two time segments immediately after the pumping ceases, and the difference in the two last-mentioned rates, and extrapolating the rate of the time segment closest to the ending of pumping, corrected by applying said last-mentioned difference, backward through the pumping cycle to arrive at a second calculated inflow rate, (4) averaging said first and second calculated inflow rates, (5) multiplying the averaged inflow rate by the time span during which the pumping was taking place to arrive at a volume of liquid entering while each pumping phase was occurring, and (6) adding in said last-mentioned volume for each pumping cycle.

GENERAL DESCRIPTION OF THE DRAWINGS

This invention is illustrated in the accompanying drawings, in which.

DETAILED DESCRIPTION OF THE DRAWINGS

Figure 1:
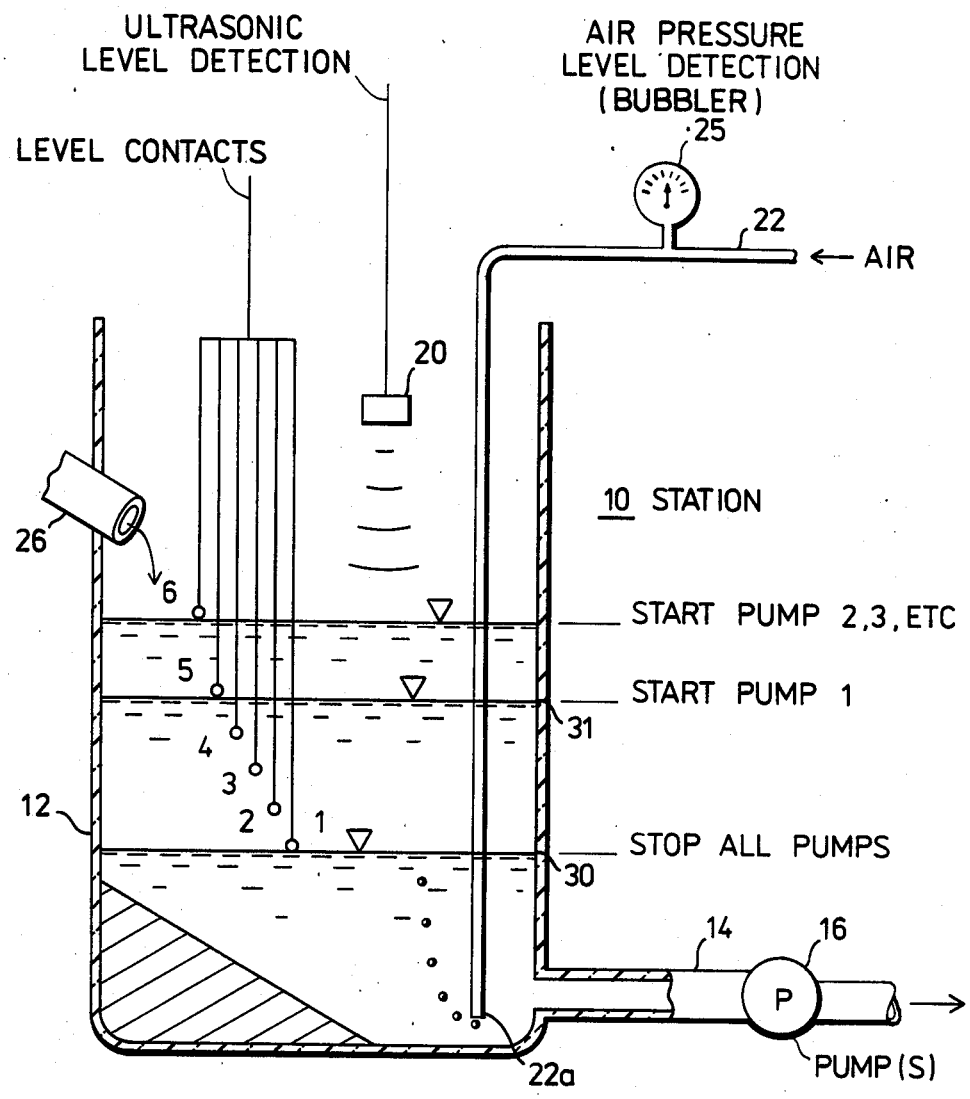
FIG. 1 is a somewhat schematic, vertical sectional view of a sewage pumping station.

In FIG. 1, a sewage pumping station generally shown by the numeral 10 includes a wetwell 12, a conduit 14 communicating with the interior of the wetwell 12, and containing one or more pumps 16.

Located in the wetwell 12 are six level detectors numbers 1–6. Detector 1 establishes a lower limit level for the liquid surface 24 in the wetwell 16, and detector 5 establishes an upper limit level for the liquid surface, at which the pump, or one of the pumps if there are more than one, is started. Detector 6 is adapted to detect arrival of the liquid surface 24 at a level above that detected by a detector 5, and can be used to bring on greater pumping capacity, for example by starting second, third, etc. pumps where there are more than one provided. In accordance with a preferred embodiment of this invention, the detectors 1–5 are all set so that they delimit equal quantities of liquid in the wetwell 12. In other words, the quantity of liquid needed to raise the surface 24 from detector 1 to detector 2 is the same as the quantity needed to raise the liquid surface from detector 2 to detector 3, and so on.

It will be understood that additional detectors may be included, though not shown, for the purpose of setting off an alarm if the liquid level rises too high or falls too low in the wetwell 12.

The provision of the physical detectors 1–6 constitutes the first embodiment of this invention. In a second embodiment, all of these detectors 1–6 may be replaced by an ultrasonic detector 20 of conventional variety, the ultrasonic detector 20 having the capability of determining and signalling the arrival of the liquid surface 24 at various predetermined vertical locations.

A further embodiment of this invention is one in which the detecting of the position of the liquid surface 24 is carried out by utilizing air pressure. Air enters a tube 22 and is bubbled up through the liquid in the wetwell 12 from the bottom of tube 22a. An air pressure gauge 25 indicates the pressure of the air within the tube 22, which will rise and fall along with the level of the surface 24. The gauge 25 can be calibrated to read the level directly, and pressure sensitive switches can be utilized (not shown) to generate signals upon the arrival of the liquid surface 24 at each of the various levels.

Still referring to FIG. 1, sewage or other liquid enters the wetwell 12 through the pipe 26, and this liquid is intermittently pumped by the pump or pumps 16 out of the wetwell 12. The method includes the following steps:

It is first assumed that the liquid surface 24 is located at the lower limit level where shown in FIG. 1, i.e. that to which the detector 1 reaches. Sewage flows into the wetwell 12 through the sewage pipe 26, thus causing the liquid surface 24 to rise from the lower limit level identified by the arrow 30 toward the upper limit level identified by the arrow 31. During this rise of the liquid surface 24 between the positions 30 and 31, the pump means 16 is not in operation.

The arrival of the liquid surface 24 at the upper limit level 31 is detected either by the detector 4, the ultrasonic detector 20, or the air pressure detector previously described, and a signal is generated which initiates pumping.

If desired, the number of pumps to be turned on (where more than one is provided) is automatically selected to be sufficient to pump the liquid out of the wetwell 12 at a faster rate than the inflow through the sewage pipe 26, thereby causing the liquid surface to drop downwardly from the level 31. Alternatively, a single pump could be provided, but with a pumping capacity substantially above the maximum that is ever likely to be flowing in through the pipe 26. The arrival of the liquid surface 24 at the lower limit level identified by the arrow 30 is then detected, at which point pumping ceases. The liquid is again permitted to rise up toward the upper limit 31, and the cycle repeats.

Figure 3:
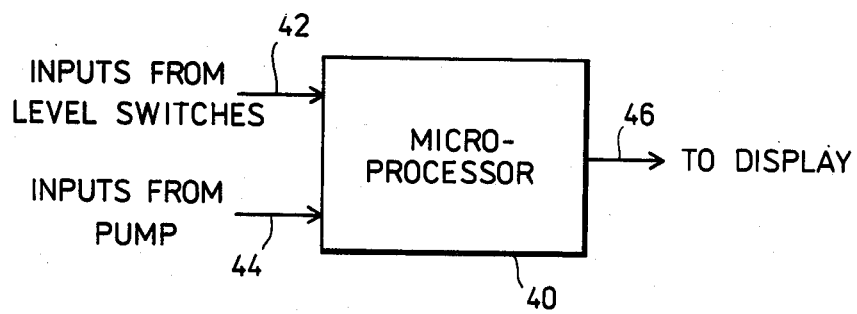
FIG. 3 is a schematic view of a microprocessor for use in this invention.

In essence, a computing device shown as microprocessor 40 in FIG. 3 is able to calculate an on-going total inflow volume for the liquid by (1) adding in the sump cavity (wetwell) volume between the lower and upper limit levels each time the liquid surface rises to the upper limit level, (2) determining the inflow rates over two time segments immediately before the pumping begins and extrapolating the trend of the rates forward through the pumping cycle to arrive at a first calculated inflow rate, (3) determining the inflow rates over two time segments immediately after the pumping ceases and extrapolating the trend of such last-mentioned rates backward through the pumping cycle to arrive at a second calculated inflow rate, (4) averaging said first and second calculated inflow rates, (5) multiplying the averaged inflow rate by the time span during which the pumping was taking place to arrive at a volume of liquid entering while pumping was occurring, and (6) adding in said last-mentioned volume.

Figure 2:
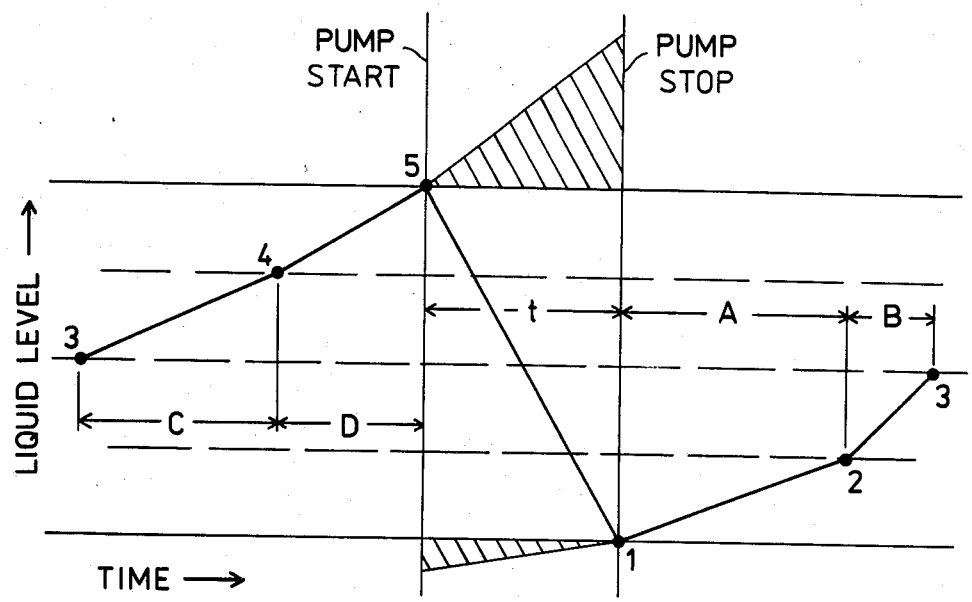
FIG. 2 is a graphical illustration for the purpose of explaining the calculation steps involved in this invention.

Attention is now directed to FIG. 2, for an explanation of the calculation steps which are undertaken by the microprocessor.

In FIG. 2, the dimension C represents the time it takes for the liquid level to rise between detectors 3 and 4, whereas the time D represents the time taken for the liquid level to rise between detectors 4 and 5. When the liquid surface reaches the detectors 5, pumping is initiated, and the downwardly sloping line 30 represents the drop of the liquid level between the time the pump starts and the time the pump ceases pumping. At the latter point, the liquid level has fallen to the detector 1, and the time A represents the time taken for the liquid level to rise to detector 2. Similarly, the time B represents the time taken for the liquid to rise between detectors 2 and 3.

As aforesaid, this invention contemplates extrapolating the trend of the liquid inflow rate just prior to the pumping cycle forwardly through that cycle to arrive at a first calculated inflow rate, and doing a similar exercise retroactively for the inflow rate just after the pumping cycle, thus extrapolating backwardly through the pumping cycle to arrive at a second calculated inflow rate. These two are then averaged to arrive at a calculated inflow rate for the duration of the pump cycle. In FIG. 2, it can be seen that time D is shorter than time C, and hence the slope of the line between points 4 and 5 is steeper than between points 3 and 4. As an example, if the calculated inflow rate between points 3 and 4 was 20 liters per second, and that between points 4 and 5 was 22 liters per second, the extrapolation into the pumping cycle would yield an inflow rate of 24 liters per second as the first calculated rate.

Looking to the right of the pumping cycle in FIG. 2, if the inflow rate during the segment A were calculated to be 18 liters per second, and that between points 2 and 3 were calculated to be 26 liters per second, then the backward extrapolation into the pump cycle would yield a second calculated inflow rate of 10 liters per second. Averaging these two inflow rates (24 liters per second and 10 liters per second) would yield a calculated inflow rate of 17 liters per second during the pump cycle. The total inflow during the pumping cycle would then be calculated by multiplying 17 liters per second by the number of seconds that the pump means ran, and this amount would then be added in to the on-going total.

It will be appreciated that the computations could be made on the basis of 3 or more segments if desired, to achieve better accuracy.

In FIG. 3, the microprocessor 40 receives input from the level detectors along line 42, and the input from the pump or pumps along line 44. The microprocessor then provides information along line 46 to a display.

It will be understood from the preceding disclosure that the microprocessor 40 would be equipped with means by which it can be programmed with the total sump volume between the lower limit level and the upper limit, and the fractional sump volume between adjacent pairs of detectors.

With regard to the pump means 16, it is preferred to provide, for a typical installation, one larger pump and one smaller pump, working in parallel. The pumps however would be capable of being operated either separately or together. The selection of the particular pump to use at any given time would be made automatically, and would be based on the measured filling rate over the most recent filling portion of the cycle, for example the time D seen in FIG. 2 between points 4 and 5. Thus, where the filling rate is smaller than a given preestablished value, the smaller of the two pumps would be utilized. Where the filling rate exceeds the predetermined value, the larger of the two pumps would be employed. A further predetermined value, higher than the one just discussed, could also be established in such a way that if the sewage inflow exceeded this latter, higher value, both pumps could be operated simultaneously to achieve maximum output.

If desired, a further pump or pumps could be provided as back-up pumps, or as pumps which can be called into operation in case of a particularly high inflow rate.

While a particular embodiment of this invention has been illustrated in the attached drawing and described hereinabove, it will be apparent to those skilled in the art that changes and modifications may be made therein, without departing from the essence of this invention as set forth in the appended claims.

The embodiments of the invention in which an exclusive property or privilege is claimed are defined as follows:

1. A method of determining the total inflow of a liquid through a liquid-flow system in which the liquid enters a wetwell and is pumped out of the wetwell by pump means, comprising the steps:

(a) allowing the liquid surface to rise between a predetermined lower limit level and a predetermined upper limit level while the pump means is shut off, (b) detecting the arrival of the liquid surface at a plurality of predetermined intermediate levels as it rises between the lower limit level and the upper limit level, the intermediate levels being vertically separated and delimiting a plurality of time segments during each of which the liquid level rises between an adjacent pair of levels, (c) detecting the arrival of the liquid surface at the upper limit level, and signalling the pump means to begin upon such arrival, (d) pumping the liquid out of the wetwell at a rate faster than the inflow rate, whereby the liquid surface falls between said upper limit level and said lower limit level, (e) detecting the arrival of the liquid surface at the lower limit level and turning off the pump means at such last-mentioned arrival, (f) again allowing the liquid surface to rise as in step (a) and repeating steps (b), (c), (d) and (e) in sequence, (g) calculating an on-going total inflow volume for the liquid by:
 (1) adding in the sump cavity volume between the lower and upper limit levels each time the liquid surface rises to the upper limit level,
 and for each pumping cycle:
 (2) determining the inflow rates over at least two time segments immediately before the pumping begins and the difference in the two rates, and extrapolating the rate of the time segment closest to the beginning of pumping, corrected by applying said difference, forward through the pumping cycle to arrive at a first calculated inflow rate,
 (3) determining the inflow rates over at least two time segments immediately after the pumping ceases, and the difference in the two last-mentioned rates, and extrapolating the rate of the time segment closest to the ending of pumping, corrected by applying said last-mentioned difference, backward through the pumping cycle to arrive at a second calculated inflow rate,
 (4) averaging said first and second calculated inflow rates,
 (5) multiplying the averaged inflow rate by the time span during which the pumping was taking place to arrive at a volume of liquid entering while each pumping phase was occurring, and
 (6) adding in said last-mentioned volume for each pumping cycle.

2. The method claimed in claim 1, in which there are at least three intermediate levels.

3. The method claimed in claim 1, in which the detection of the arrival of the liquid surface at the various levels is accomplished using float switches.

4. The method claimed in claim 1, in which the detection of the arrival of the liquid surface at the various levels is accomplished using ultrasonic detection means.

5. Apparatus for determining the total inflow for liquid entering a wetwell, comprising:
 first means for pumping the liquid out of said wetwell at a rate faster than the inflow rate,
 second means for detecting the arrival of the liquid surface at a predetermined upper limit level and for generating a first signal which turns on said first means,
 third means for detecting the arrival of the liquid surface at a predetermined lower limit level and for generating a second signal which turns off said first means,
 fourth means for detecting the arrival of the liquid surface at a plurality of predetermined intermediate levels as it rises between the lower limited level and the upper limit level, and for generating an additional signal for each such intermediate level,
 and computing means adapted to calculate an ongoing total inflow volume for the liquid by
 (1) adding in the sump cavity volume between the lower and upper limit levels each time the liquid surface rises to the upper limit level,
 and for each pumping cycle:
 (2) determining the inflow rates over at least two time segments immediately before the pumping begins and the difference in the two rates, and extrapolating the rate of the time segment closest to the beginning of pumping, corrected by applying said difference, forward through the pumping cycle to arrive at a first calculated inflow rate,
 (3) determining the inflow rates over at least two time segments immediately after the pumping ceases, and the difference in the two last-mentioned rates, and extrapolating the rate of the time segment closest to the ending of pumping, corrected by applying said last-mentioned difference, backward through the pumping cycle to arrive at a second calculated inflow rate,
 (4) averaging said first and second calculated inflow rates,
 (5) multiplying the averaged inflow rate by the time span during which the pumping was taking place to arriave at a volume of liquid entering while each pumping phase was occurring, and
 (6) adding in said last-mentioned volume for each pumping cycle.

6. The apparatus claimed in claim 5, in which there are at least three intermediate levels.

7. The apparatus claimed in claim 5, in which the detection of the arrival of the liquid surface at the various levels is accomplished using float switches.

8. The apparatus claimed in claim 5, in which the detection of the arrival of the liquid surface at the various levels is accomplished using ultrasonic detection means.

9. In a liquid pumping station having a wetwell into which liquid flows at a variable rate, and pumping means adapted to periodically pump liquid out of said wetwell at a rate faster than the maximum likely inflow rate, a method of deriving a probable inflow rate during each pumping cycle, comprising:
 (a) measuring both the inflow rate and any change in such inflow rate prior to the beginning of a pumping cycle,
 (b) calculating a first extrapolated inflow rate by combining the inflow rate prior to a pumping cycle with its rate of change,
 (c) measuring both the inflow rate and any change in said last-mentioned inflow rate subsequent to the end of a pumping cycle,
 (d) calculating a second extrapolated inflow rate by combining the inflow rate subsequent to the end of a pumping cycle with its rate of change, and
 (e) averaging the first and second extrapolated inflow rates to obtain the probable inflow rate.

10. The method claimed in claim 9, in which each said step of measuring is accomplished by (a) providing in the wetwell at least three level sensors each adapted to generate a signal when the liquid surface in the wetwell rises to its particular level, a lower level sensor being adapted to halt the pumping cycle, an upper level sensor being adapted to initiate the pumping cycle, the level sensors being vertically separated; (b) determining the inflow rate during a first time segment when the liquid surface is moving between the level of a pump-controlling sensor and the level of the next adjacent sensor; (c) determining the inflow rate during a second time segment adjacent the first time segment; (d) determining the difference in the inflow rates for the first and second time segments; and (e) extrapolating the inflow rate of the first time segment into the time of the pumping cycle, corrected by applying said difference in the inflow rates.

* * * * *